(12) United States Patent
Poisson

(10) Patent No.: US 8,295,995 B2
(45) Date of Patent: Oct. 23, 2012

(54) DISTRIBUTED APPROACH TO ELECTRONIC ENGINE CONTROL FOR GAS TURBINE ENGINES

(75) Inventor: Richard A. Poisson, Avon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 908 days.

(21) Appl. No.: 12/427,814

(22) Filed: Apr. 22, 2009

(65) Prior Publication Data

US 2010/0274416 A1 Oct. 28, 2010

(51) Int. Cl.
*G01C 23/00* (2006.01)

(52) U.S. Cl. .............................................. 701/3; 701/36

(58) Field of Classification Search ................ 701/3, 35, 701/36
See application file for complete search history.

(56) References Cited

U.S. PATENT DOCUMENTS

| | | | |
|---|---|---|---|
| 4,845,617 A * | 7/1989 | Kamenetz et al. ............. 701/35 | |
| 5,659,680 A | 8/1997 | Cunningham et al. | |
| 5,838,261 A | 11/1998 | Lauta et al. | |
| 5,922,032 A * | 7/1999 | Modeen et al. ................... 701/3 | |
| 6,052,752 A | 4/2000 | Kwon | |
| 6,504,730 B1 | 1/2003 | Cooney et al. | |
| 6,640,560 B2 | 11/2003 | Rohrbach et al. | |
| 6,694,382 B1 | 2/2004 | Kovalan et al. | |
| 6,856,045 B1 | 2/2005 | Beneditz et al. | |
| 7,069,261 B2 * | 6/2006 | Ahl et al. ............................... 1/1 | |
| 7,230,468 B2 | 6/2007 | Underwood et al. | |
| 7,353,097 B2 | 4/2008 | Bale et al. | |
| 7,439,634 B2 * | 10/2008 | Michalko ......................... 307/43 |
| 7,455,495 B2 | 11/2008 | Leogrande et al. | |
| 7,734,287 B2 * | 6/2010 | Ying .............................. 455/423 |
| 2003/0173916 A1 * | 9/2003 | Nelson et al. .................. 318/268 |
| 2006/0155437 A1 * | 7/2006 | Wang et al. ....................... 701/29 |
| 2009/0164061 A1 * | 6/2009 | Vawter et al. .................... 701/36 |

FOREIGN PATENT DOCUMENTS

| | | |
|---|---|---|
| DE | 10 2005 055000 A1 | 5/2007 |
| EP | 2 009 526 A2 | 12/2008 |
| EP | 2 014 898 A2 | 1/2009 |
| FR | 2 920 410 A1 | 3/2009 |

OTHER PUBLICATIONS

European Search Report for EP Application No. EP10250816.5, Sep. 27, 2010.

* cited by examiner

*Primary Examiner* — Hussein A. Elchanti
(74) *Attorney, Agent, or Firm* — Carlson, Gaskey & Olds, P.C.

(57) ABSTRACT

A distributed electronic engine control system includes an airframe module, an electronic engine control module, and an engine I/O module. The modules are arranged in locations remote from one another. A serial communications bus interconnects the modules with one another. A first engine controls device is connected to the engine I/O module and is configured to interact with an engine component and provide a first data. The engine I/O module includes inner loop control logic that uses the first data and produces a second data in response thereto. The electronic engine control module includes an outer loop control logic using the second data and produces a third data in response thereto. The airframe module receives power and distributes the power to the electronic engine control and engine I/O modules. The first, second and third data are provided on the serial communications bus.

20 Claims, 2 Drawing Sheets

DISTRIBUTED APPROACH TO ELECTRONIC ENGINE CONTROL FOR GAS TURBINE ENGINES

BACKGROUND

This disclosure relates to an electronic engine control system for a vehicle power plant, such as an aircraft gas turbine engine.

Numerous distributed control architectures have been envisioned and proposed in the past for aircraft. However, reliability concerns and the need to protect electronics from harsh environments led to modern federated architecture as the industry standard. Typically, large military and commercial engines are controlled by an Electronic Engine Controller (EEC) or a Full Authority Digital Engine Control (FADEC), housed in a centralized location. Commercial requirements have evolved toward a singular electronic control mounted in the relatively benign environment of the fan case. Fan case mounting necessitates long wiring harnesses that can approach weights of five pounds per foot.

By default, the centralized EEC included all the connections for the engine and airframe. In this federated architecture, the EEC receives input from various sensors and issues commands to the appropriate actuators or subsystems, such as the fuel system. Electronic feedback is provided back to the EEC to confirm proper operation. The EEC performs inner-loop control of an actuator or subsystem, for example. As a result, modern EEC's are very large, heavy and application-specific making redesigns very costly.

SUMMARY

A distributed electronic engine control system includes an airframe module, an electronic engine control module, and an engine I/O module. The modules are arranged in locations remote from one another. Each of the modules is removably secured to a docking station at each of the locations. A serial communications bus interconnects the modules with one another. A first engine controls device is connected to the engine I/O module and is configured to interact with an engine component and provide a first data.

The engine I/O module includes inner loop control logic that uses the first data and produces a second data in response thereto. The electronic engine control module includes an outer loop control logic using the second data and produces a third data in response thereto. The airframe module receives power and distributes the power to the electronic engine control and engine I/O modules. The first, second and third data are provided on the serial communications bus.

A method of controlling a gas turbine engine includes the step of receiving data from a sensor and/or effector in an engine I/O module. The first data is manipulated with an inner loop control logic to produce a second data. The first and second data are broadcast over a serial communications bus. The second data is received from the serial communications bus in an electronic engine control module located remotely from the engine I/O module. The second data is manipulated with an outer control loop logic in the electronic engine control module to produce a third data corresponding to a command signal. The command signal is broadcast over the serial communications bus. The command signal from the serial communications bus is received in the engine I/O module and used to command an engine controls device based upon the command signal.

BRIEF DESCRIPTION OF THE DRAWINGS

The disclosure can be further understood by reference to the following detailed description when considered in connection with the accompanying drawings wherein.

DETAILED DESCRIPTION

Figure 1:
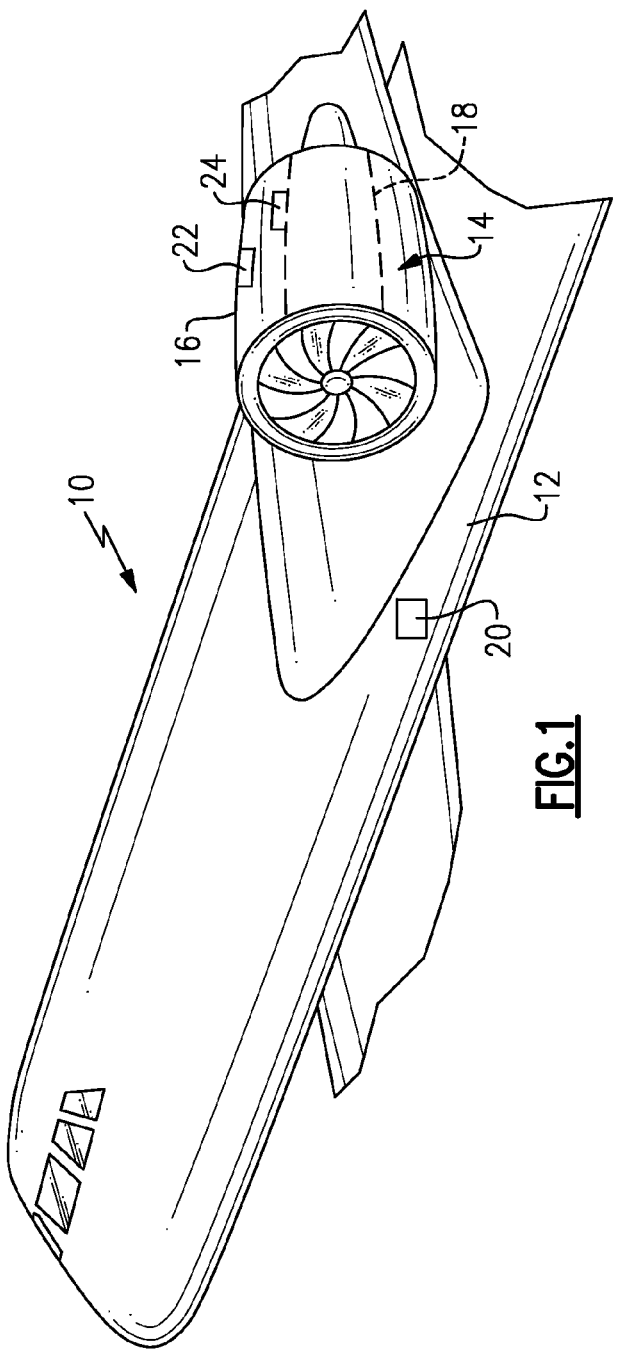
FIG. 1 is a schematic view of an aircraft.

FIG. 1 is a schematic view of an aircraft 10 that includes an airframe 12. One or more gas turbine engines 14 are supported on the airframe 12. In the example shown, the engine 14 is of the type that includes a fan case 16 surrounding a core 18. The core 18 includes a compressor section, a combustor section and a turbine section. A fan, outside the core 18, is driven by the core 18 and housed within the fan case 16.

Figure 2:
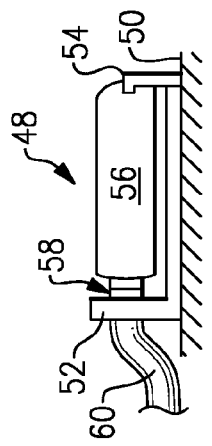
FIG. 2 is a schematic view of a line replaceable module used throughout a distributed electronic engine control system in the aircraft shown in FIG. 1.

The aircraft 10 includes a distributed electronic engine control system 19 (FIG. 3) that utilizes line replaceable units 48, as schematically illustrated in FIG. 2. Referring to FIG. 2, the line replaceable unit 48 includes a docking station 52 supported on a structure 50, which can be the airframe 12, fan case 16 or core 18. A computer module 56 is removably secured to the docking station 52 by a securing mechanism or locking feature 54. The locking feature 54 ensures good connector integrity while facilitating ease of removal and replacement. Connections 58 between the docking station 52 and computer module 56 interconnect the computer module 56 with one or more power and/or communications links 60. The modules 56 incorporate advanced chip packaging technologies, such as System-On-Chip, that allow increased functionality in smaller packages. The inclusion of high temperature CMOS processing in the modules 56, for example, provides electronic circuitry capable of surviving in a 300° C. environment. A core-mounted computer module 56 may require active cooling to help the more robust electronics counter the harsh environment.

Figure 3:
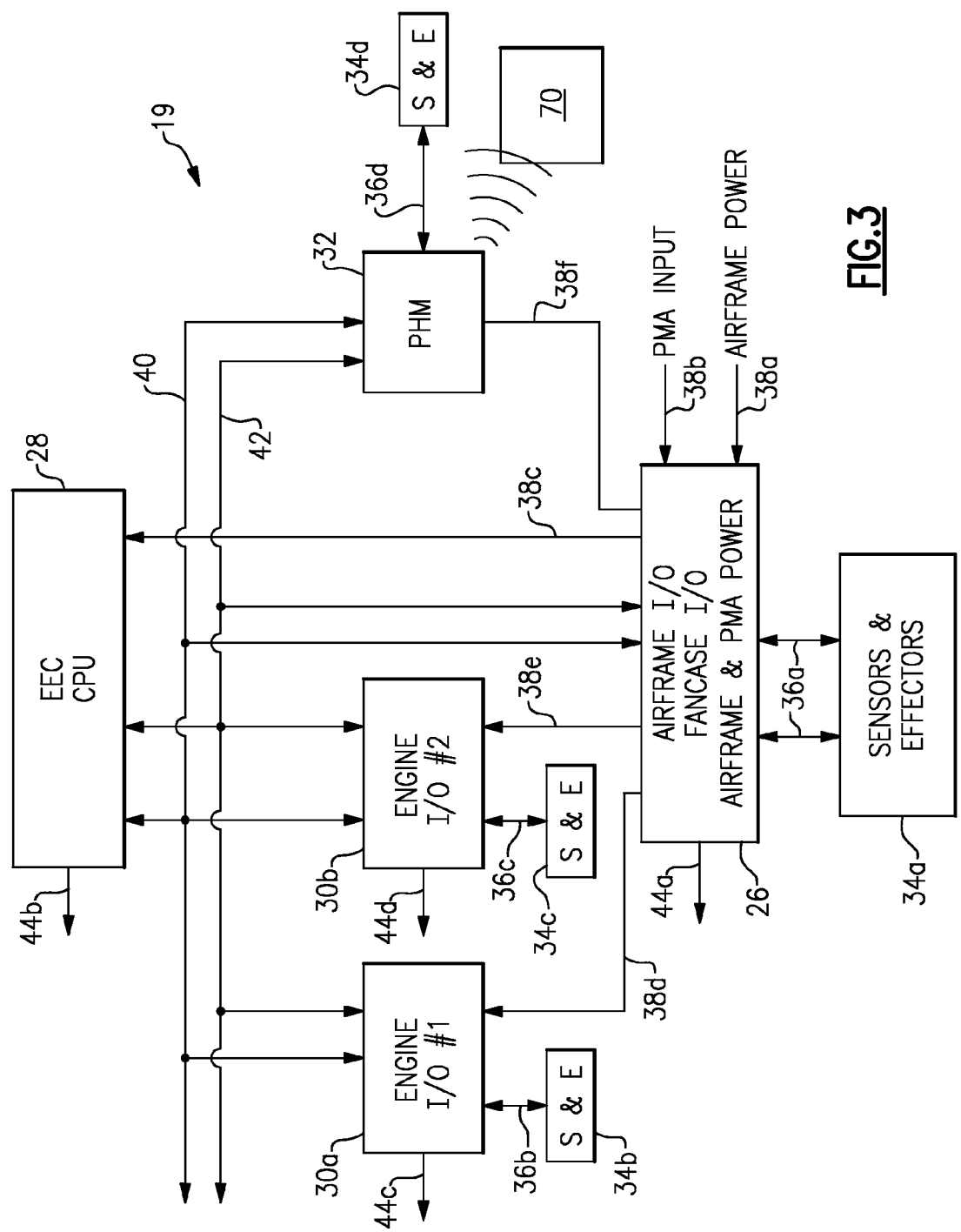
FIG. 3 is a schematic view of an example distributed electronic engine control system.

The line replaceable units 48 are used at airframe, fan case and core electronics mounting locations 20, 22, 24 illustrated in FIG. 1. Various modules are positioned throughout the aircraft 10 to provide a distributed electronic engine control system 19 (FIG. 3). The distributed architecture is configured to minimize weight, reduce engine assembly time, reduce the amount of wiring and connections and increase the overall reliability of the electronic engine control system.

An example distributed electronic engine control system 19 is illustrated in FIG. 3. An airframe module 26 is mounted in the airframe or fan case electronics mounting location 20, 22. The airframe module 26 receives and conditions airframe power 38A and permanent magnet alternator (PMA) power 38B, and distributes that power to an electronic engine control (EEC) module 28, first and second engine input/output (engine I/O) modules 30A, 30B and a prognostics and health monitoring (PHM) module 32 via power distribution lines 38A-38F. Although two engine I/O modules are shown, more or fewer may be used depending upon the aircraft application.

The airframe module 26 connects the EEC module 28 functions with the airframe mounting location 20 and its associated airframe electronics. This interface handles power conditioning from the aircraft power grid, engine control and coordination between airframe subsystems (pilot, flight controls, power distribution) and the engine subsystems, and control of the PMA power. The airframe module 26 also includes logic for operating the engines thrust reversers, for example. The airframe module 26 is bus linked to the EEC, engine I/O and PWM modules 28, 30A, 30B, 32 via first and second channel serial buses 40, 42, which provide redundancy.

The EEC module 28 is linked to other line replaceable units, such as the modules 26, 30A, 30B, 32, via the high speed serial buses 40, 42. Processors like the Motorola 8540 can run at gigahertz speeds and process large amounts of data enabling real-time processing of sensor data. Communications between modules 26, 28, 30A, 30B, 32 and with other components is supported by the latest commercially available standard serial bus node with cellular/WIFI capability. For example, firewire (IEEE-1394) or a similar high speed serial bus ensures adequate bandwidth availability to preclude data latency issues associated with many distributed concepts. Data is sent and received (i.e., broadcast) over the communication buses 40, 42 between the modules 26, 28, 30A, 30B, 32. In one example, the communication buses are serial message-based in which data arrives and departs at known times without any latency or jitter. Examples of serial message-based communications bus standards are ASDX Ethernet-type, Flexray and TTP/C time trigger protocols.

The EEC and first and second engine I/O modules 28, 30A, 30B produce signals that are provided to cross-channel links 44A-44D that include the data from both the first and second serial channel buses 40, 42. The cross channels 44A-44D carry both the first and second channel data from the buses 40, 42 so that the channels can be compared to one another by a processor (not shown) to determine the reliability of the data on those channels.

The EEC module 28 includes higher level engine control laws. In the example shown, the EEC module 28 is not connected directly to engine controls devices, such as engine sensors and effectors 34A-34D, which interact with an engine component to provide a first data. Instead the EEC module 28 performs higher level processing, or outer loop control logic, based upon lower level processing, or inner loop control logic, performed at the engine I/O modules 30A, 30B. The engine I/O modules 30A, 30B perform lower level, inner loop controls to produce a second data based upon the first data communicated directly from the engine sensors and effectors 34B, 34C. For example, the engine I/O modules perform over-speed processing, control variable stator vane actuators and control fuel metering valves. Pressure and temperature sensors and other types of sensors on the engine 14 are connected directly to the airframe module 26 and the engine modules 30A, 30B.

The EEC module receives the second data from the serial buses 40, 42 and produces a third data, which corresponds to command signals, for example. The command signals are broadcast over the serial buses 40, 42 and received by the engine I/O modules 30A, 30B, which transmits the commands to the sensors and/or effectors 34B, 34C. The sensors and/or effectors 34A communicate directly with the airframe module 26 and are configured to interact with other engine components to provide a fourth data. The fourth data is broadcast over the serial buses 40, 42.

Figure 4:
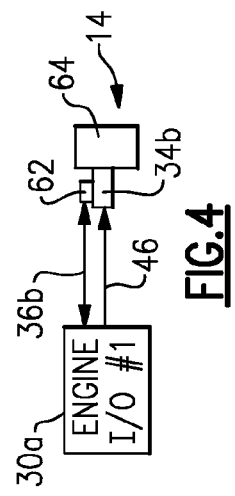
FIG. 4 is a schematic of an engine sensor/actuator in communication with an engine I/O module.

In the current federated architecture, the EEC receives input from various sensors and issues commands to the appropriate actuators or subsystems, such as the fuel system. Electronic feedback is provided back to the EEC to confirm proper operation. In this prior art architecture, the EEC performs inner-loop control of the actuator. By way of contrast, in the example distributed electronic engine control system 19, the engine I/O modules 30A, 30B receive input from various sensors and issues a position command signal 46 for a stator vane 64 to the stator vane actuator (SVA) 34B, for example, as illustrated in FIG. 4. The SVA 34B is positioned by smart, distributed electronics 62 at the point of actuation, using sensor information available on the serial buses 40, 42. The engine I/O modules 30A, 30B receive a signal back from the smart actuator reporting on status. Actuator loop closure is accomplished outside the EEC module 28 by the smart actuator electronics 62. That same actuator electronics can also report on health indicators for the actuator that it is controlling.

The power supply in the engine I/O modules 30A, 30B feature an integrated filter. The design is isolated from other power sources to ensure safe operation without compromising other power sources. Sensor modules 34A-34D enjoy their own high efficiency, local power supply from the engine I/O modules. The module performs signal processing and local built in test via digital signal processing hardware. In one example, module communications and protocols adhere to IEEE 1451 requirements for smart sensors to include local memory and transducer electronic data sheet requirements. Conventional sensor and effectors may also be used.

The engine I/O modules 30A, 30B indirectly connect the EEC module 28 with the smart components, sensors and actuators located around the engine 14. Although two engine I/O modules 30A, 30B are shown, more or fewer can be used. The engine I/O modules 30A, 30B is core mounted, for example, and executes signal conditioning software and engine over-speed processing. The engine I/O modules 30A, 30B receive sensor analog signals and transmit digital signal to the EEC module 28. The engine interface interfaces with RF components as well, for example.

The prognostics and health management (PHM) module 32 performs data reduction algorithms and stores data for later reference to determine or predict the health of various systems and components. The PHM module is optional and may not be included as part of some distributed electronic engine control systems, which depends upon the customer requirements. The PHM module 32 may also provide a high speed link to a download device for a maintenance crew. Wireless connectivity between the PHM module 32 and the download device may also be provided.

The PHM module 32 manages health management processing, data reduction algorithms, and data storage including a fifth data corresponding to prognostic and health information relating to one or more engine components. The PHM module 32 includes a high-speed download capability and wireless interconnectivity for providing the fifth data with ground processing stations, for example. Such functionality is modular and not flight critical, yet maximizes use of engine control effectors to determine health indicators and minimizes the need for additional health-specific sensors.

Although example embodiments have been disclosed, a worker of ordinary skill in this art would recognize that certain modifications would come within the scope of the claims. For that reason, the following claims should be studied to determine their true scope and content.

What is claimed is:

1. A distributed electronic engine control system comprising:
   an airframe module, an electronic engine control module, and an engine I/O module, the modules arranged in locations remote from one another, each of the modules removably secured to a docking station at each of the locations;

a serial communications bus interconnecting the modules with one another;

a first engine controls device connected to the engine I/O module and configured to interact with an engine component and provide a first data; and wherein the engine I/O module includes inner loop control logic using the first data and producing a second data in response thereto, the electronic engine control module including an outer loop control logic using the second data and producing a third data in response thereto, the airframe module receiving power and distributing the power to the electronic engine control and engine I/O modules, the first, second and third data provided on the serial communications bus.

2. The system according to claim 1, comprising an engine including the engine component and the engine controls device, wherein the engine comprises a fan case surrounding a core, the engine I/O mounted on the core.

3. The system according to claim 2, wherein the electronic engine control module is mounted on one of the core and the fan case.

4. The system according to claim 2, wherein the airframe module is mounted on one of the fan case and an airframe.

5. The system according to claim 1, wherein the modules are line replaceable units, each line replaceable unit including the docking station, one of the modules, an electrical connection interconnecting the module to its respective docking station, and a latching feature removably securing the module to its respective docking station.

6. The system according to claim 1, wherein the serial communications bus is serial message-based with the data arriving and departing on the serial communications bus at known times.

7. The system according to claim 1, wherein the first engine controls device includes one of a sensor and an actuator, the sensor configured to sense information relating to the engine component, and the actuator configured to actuate the engine component between multiple positions.

8. The system according to claim 7, wherein the first engine control device includes at least one of a variable stator vane actuator, a fuel metering valve, a temperature sensor, a pressure sensor, and a position sensor.

9. The system according to claim 1, wherein the inner loop control logic is programmed to perform at least one of shaping the first data to produce the second data, filtering the first data to produce the second data and receiving the first data to produce a command corresponding to the second data, the command provided to the first engine control device.

10. The system according to claim 1, wherein the outer loop control logic includes engine control laws, the third data corresponding to a command signal provided to the engine I/O module.

11. The system according to claim 9, wherein the inner loop control logic corresponds to engine overspeed processing.

12. The system according to claim 1, wherein the airframe module includes power conditioning logic for the power and a permanent magnet alternator interface.

13. The system according to claim 1, wherein the airframe module includes thrust reverser control logic.

14. The system according to claim 1, comprising a second engine controls device connected to the airframe control module and configured to interact with another engine component and provide a fourth data.

15. The system according to claim 1, comprising a prognostics and health monitoring module arranged in another location remote from the other locations, the prognostics and health monitoring module removably secured to a docking station at its respective location and interconnected to the serial communications bus, the prognostics and health monitoring module including data reduction algorithms and data storage corresponding to prognostics and health information relating to an engine component.

16. The system according to claim 15, comprising a download device, the prognostics and health monitoring module configured to communicate with the download device to provide a fifth data from the data storage.

17. A method of controlling a gas turbine engine comprising:
a) receiving data in an engine I/O module from at least one of a engine sensor and an engine effector;
b) manipulating the first data with an inner loop control logic residing in the engine I/O module to produce a second data;
c) broadcasting the first and second data over a serial communications bus;
d) receiving the second data from the serial communications bus in an electronic engine control module located remotely from the engine I/O module, the electronic engine control module including an outer loop control logic;
e) manipulating the second data with the outer control loop logic to produce a third data corresponding to a command signal;
f) broadcasting the command signal over the serial communications bus; and
g) receiving the command signal from the serial communications bus in the engine I/O module and commanding an engine controls device based upon the command signal.

18. The method according to claim 17, wherein the gas turbine engine includes a fan case surrounding a core, the engine I/O module removably mounted on the core and the electronic engine control module removably mounted on the fan case.

19. The method according to claim 17, comprising the step of h) monitoring a health of an engine component in a prognostics and health monitoring module based upon the data received from the communications bus, the prognostics and health monitoring module located remotely from the electronic engine control and engine I/O modules.

20. A distributed electronic engine control system comprising:
an airframe module, an electronic engine control module, and an engine I/O module, the modules discrete from one another and arranged in locations remote from one another;
a communications bus interconnecting the modules with one another;
a first engine controls device connected to the engine I/O module and configured to interact with an engine component and provide a first data; and
wherein the engine I/O module includes inner loop control logic using the first data and producing a second data in response thereto, the electronic engine control module including an outer loop control logic using the second data and producing a third data in response thereto, the airframe module providing power conditioning, the first, second and third data provided on the serial communications bus.

* * * * *